(12) United States Patent
Tsai et al.

(10) Patent No.: US 9,292,130 B2
(45) Date of Patent: Mar. 22, 2016

(54) OPTICAL TOUCH SYSTEM AND OBJECT DETECTION METHOD THEREFOR

(75) Inventors: Cheng Nan Tsai, Hsin-Chu (TW); Tzung Min Su, Hsin-Chu (TW); Chih Hsin Lin, Hsin-Chu (TW); Yuan Yu Peng, Hsin-Chu (TW); Teng Wei Hsu, Hsin-Chu (TW); Yu Chia Lin, Hsin-Chu (TW)

(73) Assignee: PIXART IMAGING INC., Hsin-Chu County (TW)

(*) Notice: Subject to any disclaimer, the term of this patent is extended or adjusted under 35 U.S.C. 154(b) by 700 days.

(21) Appl. No.: 13/240,328

(22) Filed: Sep. 22, 2011

(65) Prior Publication Data

US 2012/0075253 A1    Mar. 29, 2012

(30) Foreign Application Priority Data

Sep. 29, 2010    (TW) ............................... 99132984 A (51) Int. Cl.
    *G06F 3/042*    (2006.01)
(52) U.S. Cl.
    CPC ...... *G06F 3/042* (2013.01); *G06F 2203/04104* (2013.01)

(58) Field of Classification Search
    CPC .............. G06F 3/0412; G06F 3/042; G06F 2203/04106; G06F 3/0421; G06F 2203/04104; G06F 3/0488; G06K 9/00
    USPC ................................ 345/175, 173; 178/18.09
    See application file for complete search history.

(56) References Cited

U.S. PATENT DOCUMENTS

| | | | |
|---|---|---|---|
| 2005/0281466 A1* | 12/2005 | Siah et al. | 382/199 |
| 2010/0220077 A1* | 9/2010 | Fukunaga | G06F 3/0412 345/175 |
| 2010/0225617 A1* | 9/2010 | Yoshimoto et al. | 345/175 |
| 2010/0321340 A1* | 12/2010 | Hsiao et al. | 345/175 |
| 2011/0069037 A1* | 3/2011 | Su | 345/175 |

FOREIGN PATENT DOCUMENTS

| | | |
|---|---|---|
| CN | 101430868 A | 5/2009 |
| TW | 201007520 A | 2/2010 |

* cited by examiner

*Primary Examiner* — Grant Sitta
*Assistant Examiner* — Amen Bogale
(74) *Attorney, Agent, or Firm* — Hauptman Ham, LLP (57) ABSTRACT

The present invention provides an optical touch system configured to determine an object region according to a brightness information acquired by a brightness sensing unit and to identify a block information of objects within the object region according to an image information acquired by an image sensing unit. The present invention further provides an objection detection method for an optical touch system.

15 Claims, 7 Drawing Sheets

OPTICAL TOUCH SYSTEM AND OBJECT DETECTION METHOD THEREFOR

CROSS REFERENCE TO RELATED APPLICATION

This application claims the priority benefit of Taiwan Patent Application Serial Number 099132984, filed on Sep. 29, 2010, the full disclosure of which is incorporated herein by reference.

BACKGROUND

1. Field of the Invention

This invention generally relates to a touch system and, more particularly, to an optical touch system for detecting multi-touch gesture and an object detection method therefor.

2. Description of the Related Art

In recent years, the touch panel has been widely applied to various electronic devices due to its convenience, and the optical touch panel is especially favored by designers as it can be used for multi-touch operation.

Figure 1A:
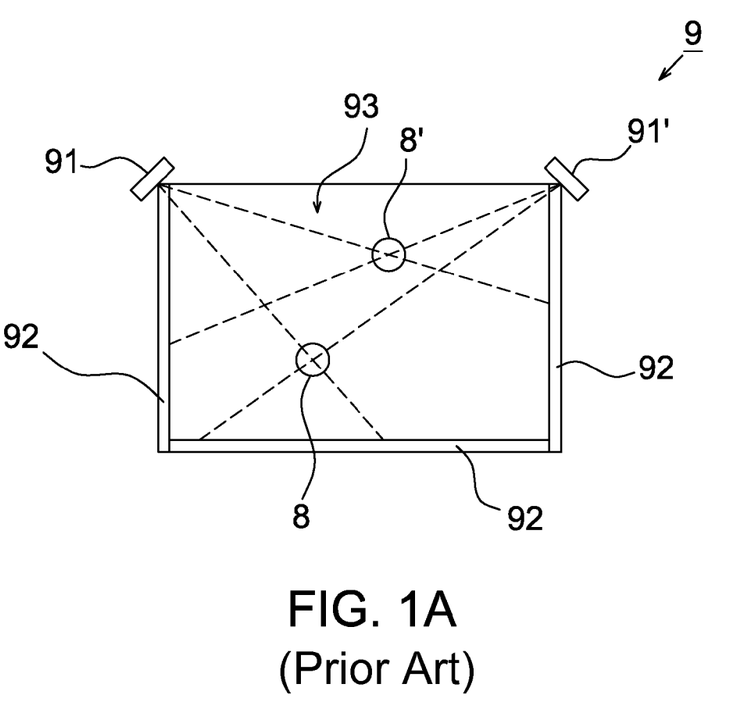
FIG. 1A shows an operational schematic diagram of a conventional optical touch panel.
Figure 1B:
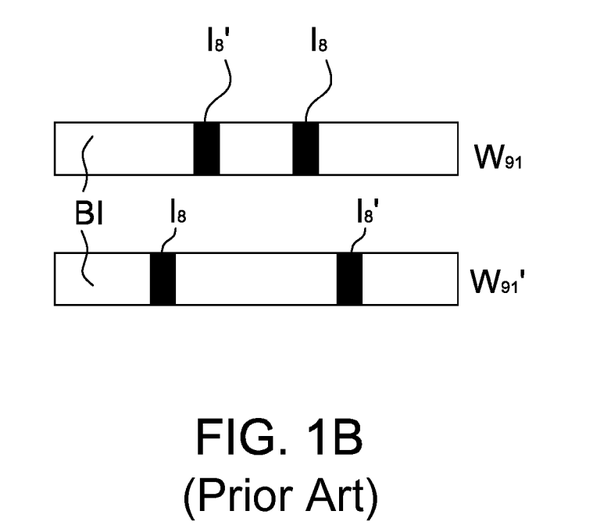
FIG. 1B shows a schematic diagram of image windows acquired by the image sensors shown in FIG. 1A.

Please refer to FIG. 1A, it shows a conventional optical touch panel 9, which includes two image sensors 91 and 91', invisible light sources 92 and a touch surface 93. When two fingers 8 and 8' are close to the touch surface 93, the image sensors 91 and 91' can respectively acquire an image window $W_{91}$ and $W_{91}'$ as shown in FIG. 1B. The image windows $W_{91}$ and $W_{91}'$ contain shadows $I_8$ and $I_8'$ of the fingers 8 and 8' from blocking the light sources 92 and background images BI, wherein as the background images BI in the image windows $W_{91}$ and $W_{91}'$ are corresponding to the image of the light sources 92, they have a higher brightness. A processing unit (not shown) can generate a 2-dimensional plane space corresponding to the touch surface 93 according to the image windows $W_{91}$ and $W_{91}'$, and calculate positions of the fingers 8 and 8' on the 2-dimensional plane space according to one-dimensional positions of the shadows $I_8$ and $I_8'$ in the image windows $W_{91}$ and $W_{91}'$.

Figure 2A:
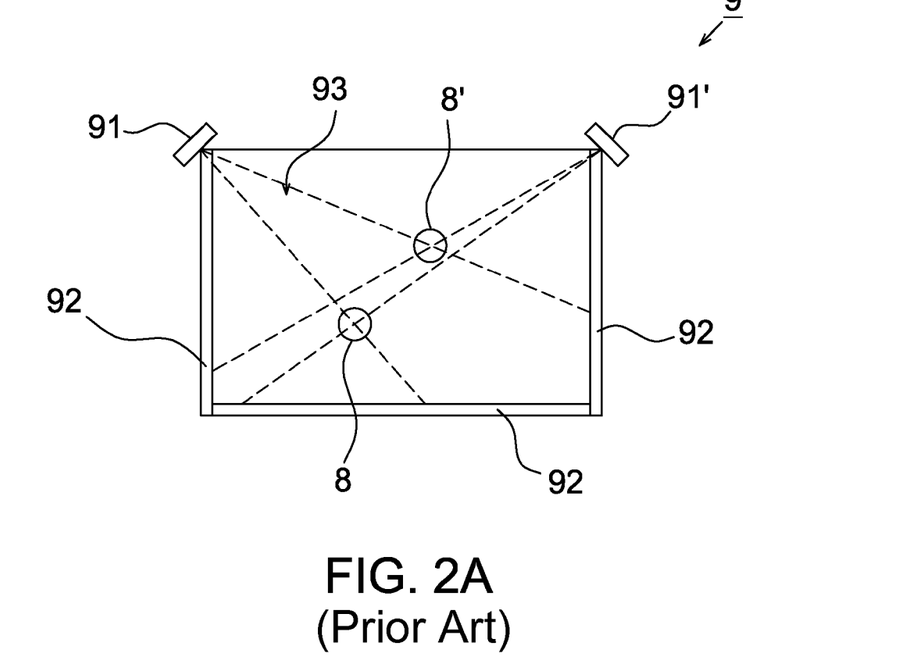
FIG. 2A shows another operational schematic diagram of a conventional optical touch panel, wherein one finger blocks the other with respect to an image sensor.
Figure 2B:
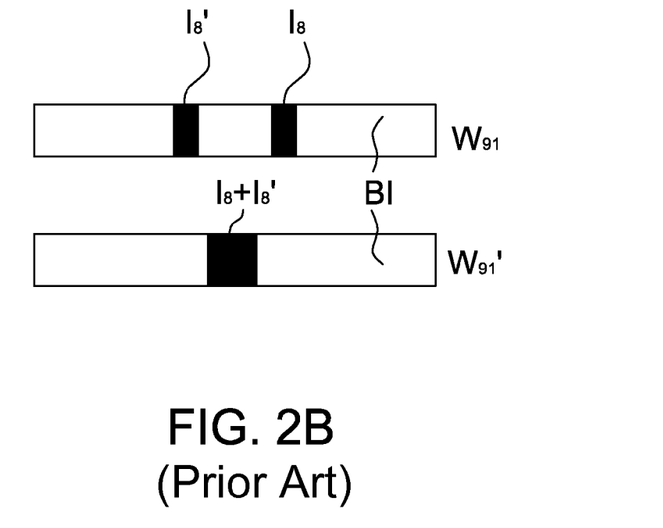
FIG. 2B shows a schematic diagram of image windows acquired by the image sensors shown in FIG. 2A.

However, when one of the fingers 8 and 8' blocks the other with respect to the image sensors 91 and 91', for example as shown in FIG. 2A, the image windows acquired by the image sensors may have different numbers of shadows; for example, the image window $W_{91}$ acquired by the image sensor 91 contains two shadows $I_8$ and $I_8'$ but the image window $W_{91}'$ acquired by the image sensor 91' contains only one merged shadow $I_8+I_8'$. As a result, the processing unit is not able to calculate correct positions of the fingers 8 and 8' on the 2-dimensional plane space according to the shadows $I_8$, $I_8'$ and $I_8+I_8'$.

Accordingly, the present invention provides an optical touch system capable of acquiring image windows having brightness information and image features. The optical touch system may identify an object range according to the image windows having the brightness information and distinguish the objects blocking each other according to the image windows having the image features thereby increasing the accuracy of object positioning.

SUMMARY

The present invention provides an optical touch system and an object detection method therefor that can identify a merged image according to a brightness information and an image feature thereby increasing the accuracy of object positioning.

The present invention provides an object detection method for an optical touch system, and the optical touch system identifies at least one object according to an image of the object blocking light and an image of the object reflecting light. The object detection method includes: acquiring a first image and a second image, wherein the first image has a brightness information and is formed by the object blocking the light and the second image has an image feature and is formed by the object reflecting the light; calculating a representative brightness of every column of pixels in the first image according to the brightness information; determining an object range in the first image according to the representative brightness; calculating the image feature associated with the object range in the second image; and identifying a block information of the object within the object range according to the image feature associated with the object range.

According to the object detection method for an optical touch system of the present invention, the step of determining the object range further includes the steps of: acquiring a background image having a brightness information without any object image; calculating a representative brightness of every column of pixels in the background image according to the brightness information without any object image; calculating a difference between the representative brightness of every column of pixels in the first image and that in the background image; and determining the object range as a part of columns of pixels having the difference larger than a brightness threshold, or as a part of columns of pixels in the first image having the representative brightness smaller than a threshold.

The present invention further provides an object detection method for an optical touch system, and the optical touch system identifies at least one object according to an image of the object blocking light and an image of the object reflecting light. The object detection method includes the steps of: acquiring a first image and a second image, wherein the first image has a brightness information and is formed by the object blocking the light and the second image has an image feature and is formed by the object reflecting the light; acquiring a first background image having a brightness information without any object image and a second background image having an image feature without any object image; respectively calculating a representative brightness of every column of pixels in the first image and the first background image according to the brightness information; calculating a difference between the representative brightness of every column of pixels in the first image and that in the first background image, and defining a part of columns of pixels having the difference larger than a brightness threshold as an object range; calculating a first image feature associated with the object range in the second image; calculating a second image feature associated with the object range in the second background image; calculating a difference between the first image feature and the second image feature; and identifying a block information of the object within the object range according to the difference between the first and the second image features.

The present invention further provides an optical touch system including a brightness sensing unit, an image sensing unit and a processing unit. The brightness sensing unit is configured to acquire a first image having a brightness information and formed by at least one object blocking light. The image sensing unit is configured to acquire a second image having an image feature and formed by the object reflecting light. The processing unit is for determining an object range according to a representative brightness of every column of pixels in the first image and calculating the image feature associated with the object range in the second image thereby identifying a block information of the object within the object range.

In the optical touch system and object detection method therefor, the first background image and the second background image are acquired and stored in the optical touch system during turn-on of the optical touch system, or they are the image windows acquired before the brightness sensing unit acquires an image window containing at least one object image, i.e. they contain no object image.

In the optical touch system and object detection method therefor, the image feature may be a brightness value, a chroma, an edge and/or a texture. The representative brightness may be a sum of brightness or an average brightness of all pixels in every column of pixels. The block information may be an information of the object blocking each other and/or an information of the object type. The object may be a finger or a touch pen for touch control.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE EMBODIMENT

In the drawings of the present invention, only a part of the components are shown and other components that are not directly related to the present invention are omitted.

It should be noted that, wherever possible, the same reference numbers will be used throughout the drawings to refer to the same or like parts.

Figure 3A:
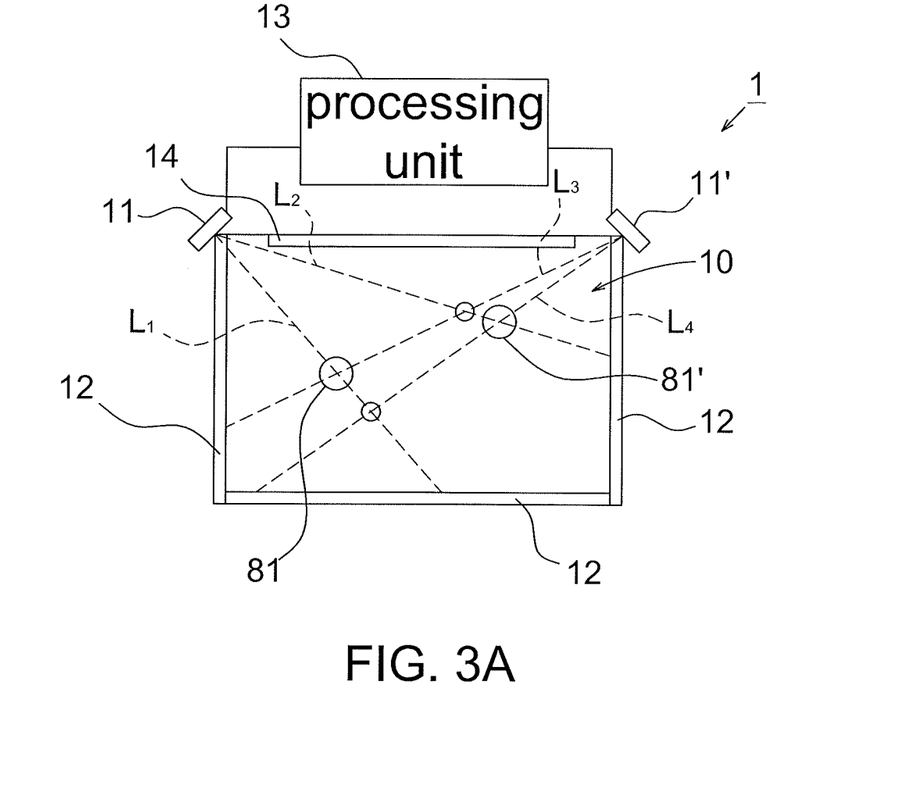
FIG. 3A shows a schematic diagram of the optical touch system according to an embodiment of the present invention.

Please refer to FIG. 3A, it shows a schematic diagram of the optical touch system according to an embodiment of the present invention. The optical touch system 1 includes a touch surface 10, a first image sensor group 11, a second image sensor group 11', light sources 12 and a processing unit 13. The light sources 12 may be any proper active light sources, e.g. visible light sources or invisible light sources. The light sources 12 preferably illuminate toward field of views of the first image sensor group 11 and second image sensor group 11'.

In another embodiment, the light sources 12 may be passive light sources (e.g. reflecting components) configured to reflect visible or invisible light, and the optical touch system may further include an additional light source to emit light to be reflected by the light sources 12. For example, the additional light source may be a light emitting diode (LED) disposed adjacent to or integrated on the first image sensor group 11 and the second image sensor group 11', but not limited thereto.

Figure 3B:
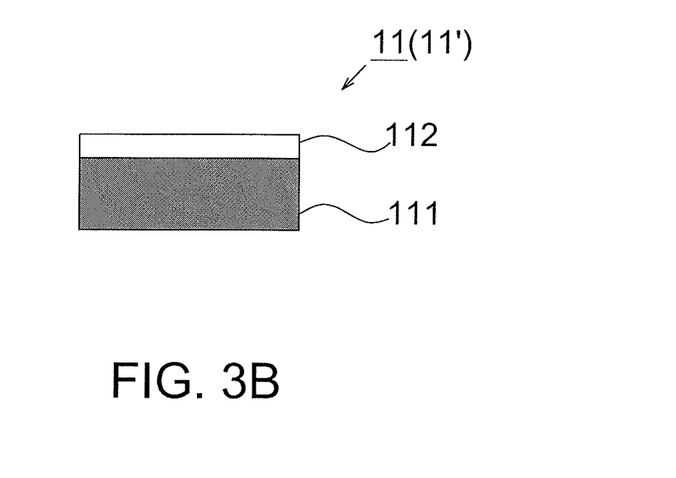
FIG. 3B shows a schematic diagram of the image sensor group shown in FIG. 3A, wherein the image sensor group includes a brightness sensing unit and an image sensing unit.

The first image sensor group 11 and the second image sensor group 11' may further include a brightness sensing unit 111 and an image sensing unit 112. The brightness sensing unit 111 and the image sensing unit 112 are configured to acquire image windows looking across the touch surface 10 and containing images of at least one object (e.g. two objects 81 and 81' are shown herein) hovering above (or contacting) the touch surface 10. In one embodiment, the brightness sensing unit 111 may be the sensing matrix of an invisible light image sensor and the image sensing unit 112 may be the sensing matrix of a visible light image sensor, i.e. the brightness sensing unit 111 and the image sensing unit 112 are respectively disposed in different image sensors. In another embodiment, the brightness sensing unit 111 and the image sensing unit 112 may be partial area of the same visible light sensing array, and an invisible light filter may be disposed on the light path of the brightness sensing unit 11 in sensing images to block visible light, i.e. the brightness sensing unit 111 and the image sensing unit 112 are disposed in the same image sensor. In addition, the brightness sensing unit 111 may be any sensing unit capable of sensing visible light as long as it is able to acquire image windows having brightness information.

In addition, in other embodiments the optical touch system 1 may further include a visible light source 14 for illuminating the objects 81 and 81' to increase the sensing efficiency of the image sensing unit 112, but the visible light source 14 may not be implemented. That is, if the visible light source 14 is not implemented, the objects may reflect ambient lights such that the total power consumption of the system can be reduced. It should be mentioned that, the size of every component and the spatial relationship therebetween shown in FIGS. 3A and 3B are only examples rather than limitations to the present invention. It is appreciated that, the light sources 12 may be composed of a plurality of active light sources or passive light sources respectively disposed at different positions or different sides of the touch surface 10 without particular limitation as long as their disposed positions may allow the image sensor groups 11 and 11' to acquire image windows having the light sources 12 as background and containing shadows of the objects 81 and 81' from blocking the light sources 12.

Figure 3C:
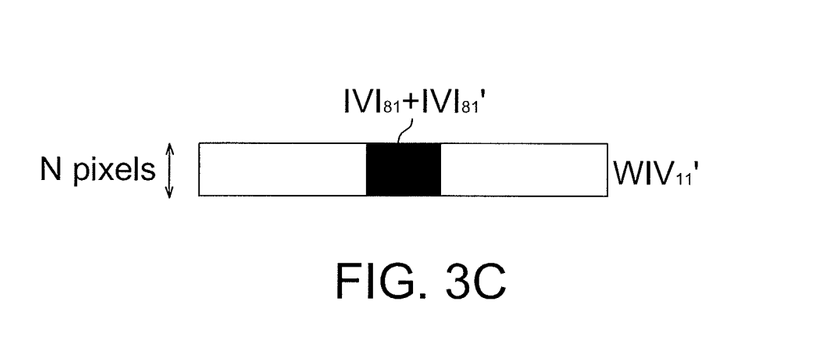
FIG. 3C shows a schematic diagram of an image window, which has a brightness information, acquired by the brightness sensing unit shown in FIG. 3B.
Figure 3D:
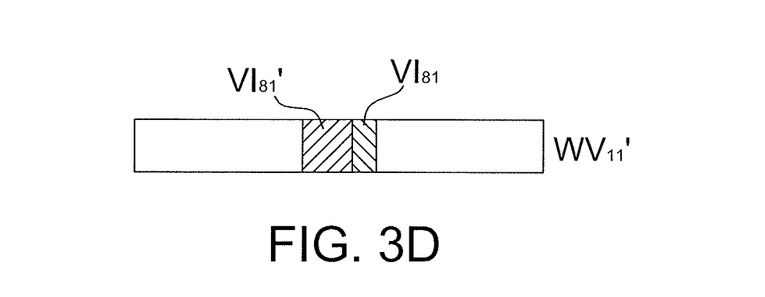
FIG. 3D shows a schematic diagram of an image window, which has an image feature, acquired by the image sensing unit shown in FIG. 3B.

When a plurality of objects block each other with respect to an image sensor group, e.g. one of the objects 81 and 81' blocking the other with respect to the second image sensor group 11' herein, the brightness sensing unit 111 of the second image sensor group 11' can only sense a merged shadow of the objects 81 and 81' as shown in FIG. 3C. The merged shadow contains only gray level (brightness) information and thus the processing unit 13 is difficult to distinguish different objects. Although the image sensing unit 112 of the second image sensor group 11' also senses a merged shadow of the objects 81 and 81' as shown in FIG. 3D, it contains at least information of image features such as a brightness value, chroma, texture and/or edge. The processing unit 13 may identify block information of the objects according to the information of image features, e.g. the image area and/or width of the objects 81 and 81', so as to identify information of the object blocking each other and/or information of the object type. The object type refers to a finger or a touch pen for touch control.

In other words, the optical touch system 1 of the present invention may identify the block information of the objects 81 and 81' in the image windows acquired by the image sensor groups 11 and 11' according to image windows acquired by the brightness sensing unit 111 having a brightness information and formed by the objects 81 and 81' from blocking the light sources 12 and according to image windows acquired by the image sensing unit 112 having an image feature and formed by the objects 81 and 81' from reflecting light (preferably visible light), and details thereof will be illustrated hereinafter.

Figure 4A:
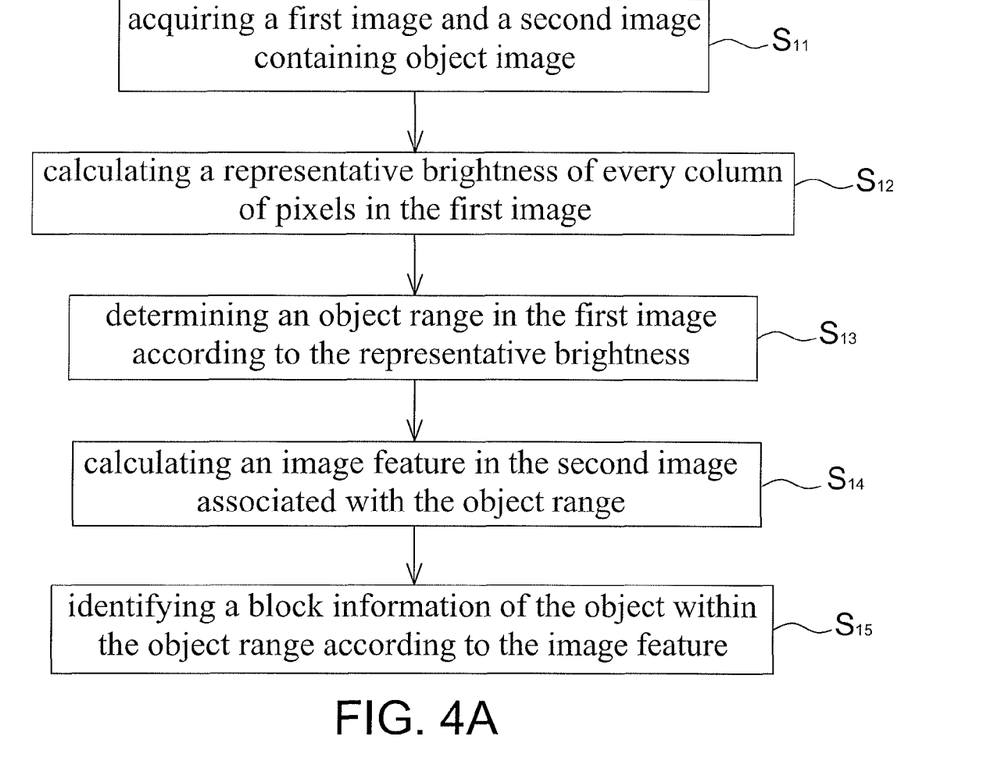
FIG. 4A shows a flow chart of the object detection method for optical touch system according to the first embodiment of the present invention.

Please refer to FIG. 4A, it shows a flow chart of the object detection method for an optical touch system according to the first embodiment of the present invention. The object detection method includes the steps of: acquiring a first image and a second image containing object image (Step $S_{11}$); calculating a representative brightness of every column of pixels in the first image (Step $S_{12}$); determining an object range in the first image according to the representative brightness (Step $S_{13}$); calculating an image feature in the second image associated with the object range (Step $S_{14}$); and identifying a block information of the object within the object range according to the image feature (Step $S_{15}$); wherein the first image may be a visible light image or an invisible light image, and the second image may be a visible light image.

Figure 4B:
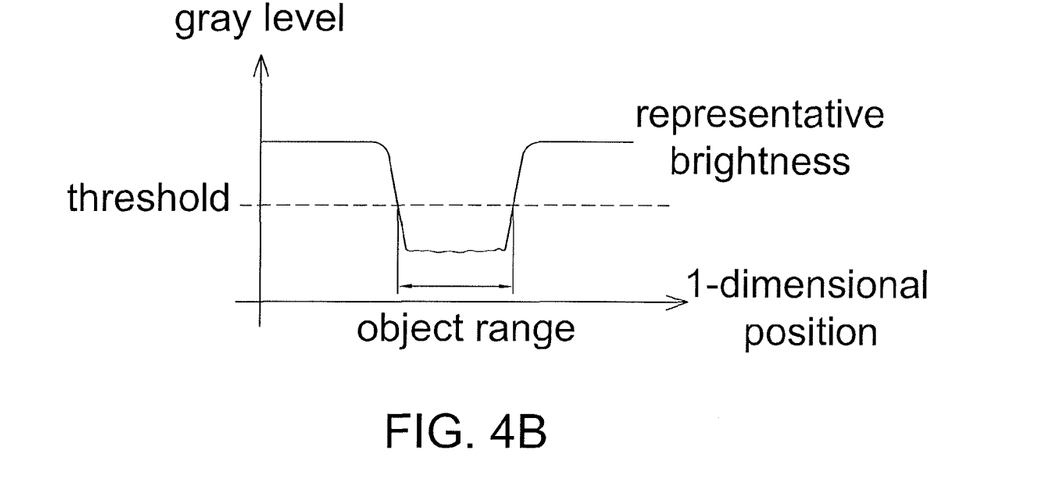
FIG. 4B shows a schematic diagram of an object range determined according to a representative brightness of every column of pixels in the first image of FIG. 4A.

Please refer to FIGS. 3A-3D and 4A-4B together, as one of the objects 81 and 81' blocks the other with respect to the second image sensor group 11' herein, the image window acquired by the second image sensor group 11' is used as an example for illustration, but not limited thereto. First, the brightness sensing unit 111 of the second image sensor group 11' acquires a first image $WIV_{11}'$ having a brightness information and formed by the objects 81 and 81' from blocking the light sources 12, and the image sensing unit 112 acquires a second image $WV_{11}'$ having an image feature and formed by the objects 81 and 81' from reflecting ambient light or the light from the visible light source 14 (Step $S_{11}$). The processing unit 13 then calculates a representative brightness of every column of pixels in the first image $WIV_{11}'$, e.g. a sum of brightness or an average brightness of all pixels in every column of pixels (Step $S_{12}$); for example, but not limited to, a sum of brightness or an average brightness of 8 pixels in every column of pixels. Next, the processing unit 13 determines an object range according to the calculated representative brightness. For example, when the first image $WIV_{11}'$ contains an object image (e.g. $IVI_{81}+IVI_{81}'$ shown in FIG. 3C), the columns of pixels associated with the object image may have a lower representative brightness as shown in FIG. 4B. Therefore, the processing unit 13 may identify the part of columns of pixels having the representative brightness smaller than a threshold as an object range (Step $S_{13}$); wherein the threshold may be previously set according to a value actually measured, for example an average value of all pixels in the first image $WIV_{11}'$ or a ratio thereof, but not limited thereto. The processing unit 13 then calculates an image feature, e.g. a brightness value, chroma, edge and/or texture, in the second image $WV_{11}'$ corresponding to the object range calculated in the Step $S_{13}$ (Step $S_{14}$); wherein different objects will have different brightness values, chroma, edges and/or texture and different types of objects will have different image features. The processing unit 13 may identify a block information of the object within the object range in the image windows acquired by the image sensor groups 11 and 11' according to the image features; e.g. identifying image areas and widths associated with every object in the merged shadow according to different brightness values, chroma, edges and/or texture so as to identify an information of the object blocking each other (e.g. one-dimensional positions of every object in the first image $WIV_{11}'$) and/or an information of the object type (Step $S_{15}$). In this manner, the processing unit 13 is able to identify the objects blocking each other and/or different object types.

Figure 5A:
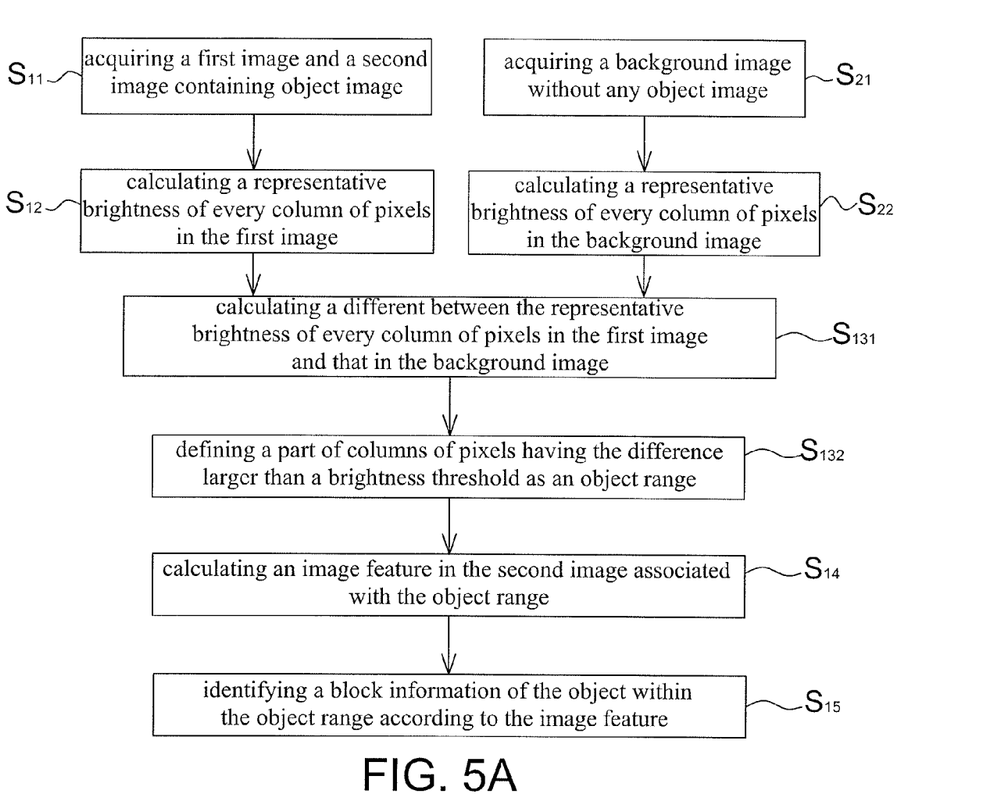
FIG. 5A shows a flow chart of the object detection method for optical touch system according to the second embodiment of the present invention.

Please refer to FIG. 5A, it shows a flow chart of the object detection method for an optical touch system according to the second embodiment of the present invention. The object detection method includes the steps of: acquiring a first image and a second image containing object image (Step $S_{11}$); calculating a representative brightness of every column of pixels in the first image (Step $S_{12}$); acquiring a background image without any object image (Step $S_{21}$); calculating a representative brightness of every column of pixels in the background image (Step $S_{22}$); calculating a different between the representative brightness of every column of pixels in the first image and that in the background image (Step $S_{131}$); defining a part of columns of pixels having the difference larger than a brightness threshold as an object range (Step $S_{132}$); calculating an image feature in the second image associated with the object range (Step $S_{14}$); and identifying a block information of the object within the object range according to the image feature (Step $S_{15}$); wherein the first image and the background image may be an invisible light image or a visible light image, and the second image may be a visible light image. The main difference between this embodiment and the first embodiment is in the method for determining the object range. In this embodiment, the background noise is removed from the first image so as to increase the accuracy of determining the object range. Therefore, steps $S_{11}$ to $S_{12}$ and $S_{14}$ to $S_{15}$ are identical to the first embodiment and will not be repeated, and only the difference from the first embodiment will be explained herein. In addition, in one embodiment the steps $S_{21}$, $S_{22}$, $S_{131}$ and $S_{132}$ may be combined as sub-steps of the step $S_{31}$ of the first embodiment.

Figure 5B:
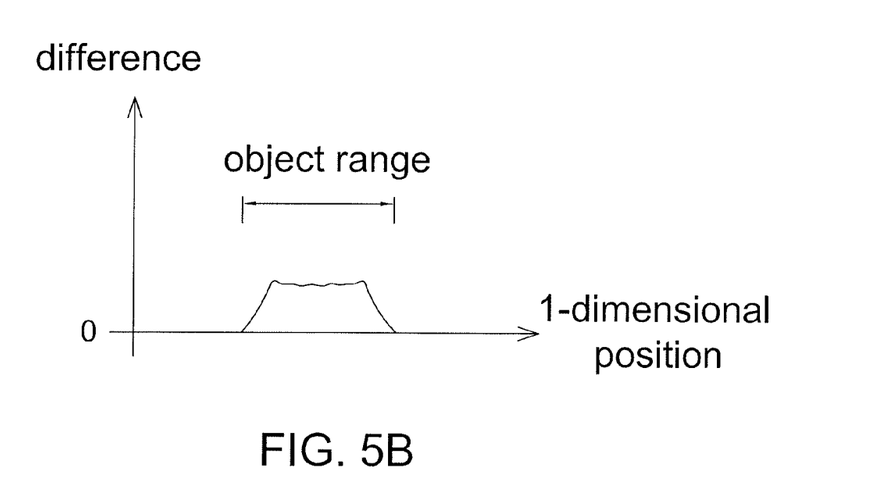
FIG. 5B shows a schematic diagram of an object range determined according to a difference between representative brightness of every column of pixels in the first image and the first background image of FIG. 5A.

Please refer to FIGS. 3A-3D and 5A-5B together, in order to make the processing unit 13 be able to identify whether an object image is included in the image window acquired by the brightness sensing unit 111 of the second image sensor group 11', in this embodiment the second image sensor group 11' first acquires a background image having a brightness information containing only background image but without any object image (Step $S_{12}$), wherein the background image may be acquired by the brightness sensing unit 111 and stored in the optical touch system 1 during turn-on of the optical touch system 1, or may be an image window acquired before the brightness sensing unit 111 acquires an image window containing at least one object image. The processing unit 13 then calculates a representative brightness of every column of pixels in the background image, e.g. a sum of brightness or an average brightness of all pixels in every column of pixels (Step $S_{22}$), and previously stores the representative brightness of the background image in the processing unit 13 or a storage unit (not shown) to be accessed by the processing unit 13, wherein as the background image contains no object image, it has a substantially uniform gray level (e.g. an image window shown in FIG. 3C after the object image $IVI_{81}+IVI_{81}'$ being removed). Next, the processing unit 13 calculates a difference between the representative brightness of every column of pixels in the first image and that in the background image (Step $S_{131}$), and defines a part of columns of pixels having the difference larger than a brightness threshold as an object range (Step $S_{132}$) as shown in FIG. 5B such that the background noise can be removed to increase the calculation accuracy. In one embodiment, the brightness threshold may be set as 0, but not limited thereto. The processing unit 13 then executes steps $S_{14}$ and $S_{15}$ to identify the block information of the object within the object range.

Figure 6A:
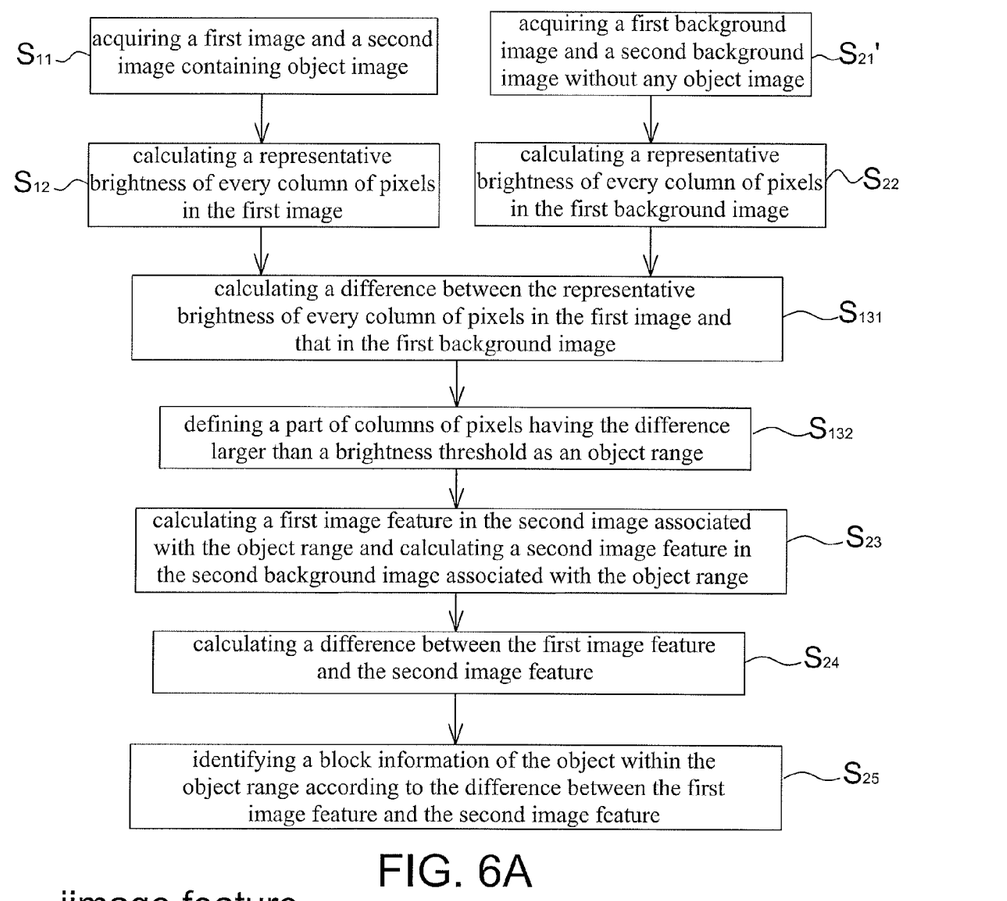
FIG. 6A shows a flow chart of the object detection method for optical touch system according to the third embodiment of the present invention.

Please refer to FIG. 6A, it shows a flow chart of the object detection method for an optical touch system according to the third embodiment of the present invention. The object detection method includes the steps of acquiring a first image and a second image containing object image (Step $S_{11}$); calculating a representative brightness of every column of pixels in the first image (Step $S_{12}$); acquiring a first background image and a second background image without any object image (Step $S_{21}'$); calculating a representative brightness of every column of pixels in the first background image (Step $S_{22}$); calculating a difference between the representative brightness of every column of pixels in the first image and that in the first background image (Step $S_{131}$); defining a part of columns of pixels having the difference larger than a brightness threshold as an object range (Step $S_{132}$); calculating a first image feature in the second image associated with the object range and calculating a second image feature in the second background image associated with the object range (Step $S_{23}$); calculating a difference between the first image feature and the second image feature (Step $S_{24}$); and identifying a block information of the object within the object range according to the difference between the first image feature and the second image feature (Step $S_{25}$); wherein the first image and the first background image may be invisible light images or visible light images, and the second image and the second background image may be visible light images. The main difference between this embodiment and the second embodiment is that, in this embodiment the method for identifying the block information of the object within the object range uses both the image features with and without object image. Therefore, in addition to the step $S_{21}'$ needs to further acquire a second background image having the image feature without any object image, other steps of $S_{11}$~$S_{132}$ are identical to the steps $S_{11}$~$S_{132}$ of FIG. 5A; thus details will not be repeated and only the difference from FIG. 5A will be explained herein. In addition, the first and second background images may be acquired and stored in the optical touch system during turn-on of the optical touch system, or may be the image windows acquired before the optical touch system acquires an image window containing at least one object image, i.e. they contain no object image.

Figure 6B:
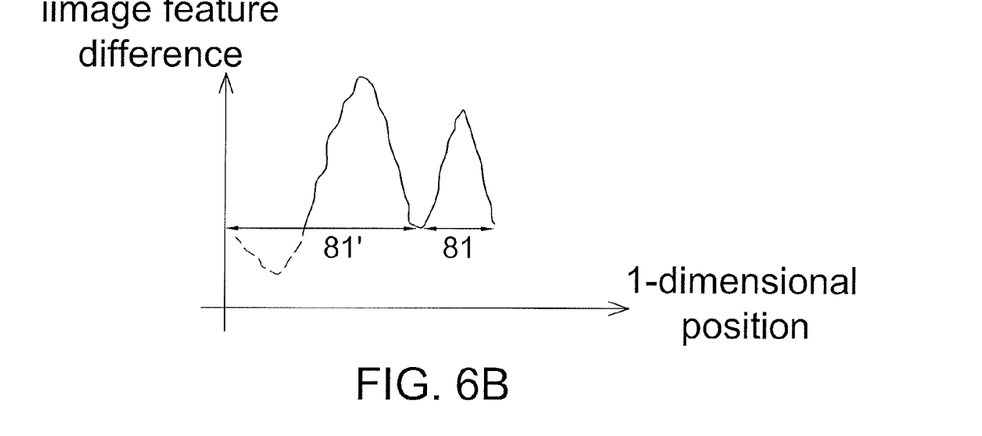
FIG. 6B shows a schematic diagram of a difference between the first image feature and the second image feature of FIG. 6A.

Please refer to FIGS. 3A-3D and 6A-6B together, when identifying that the image windows acquired by the image sensor groups 11 and 11' contain at least one object image, the processing unit 133 then determines an object range according to the steps $S_{11}$-$S_{132}$. Next, the processing unit 13 calculates a first image feature in the second image associated with the object range and a second image feature in the second background image associated with the object range (Step $S_{23}$); wherein the first image feature and the second image feature may be brightness values and/or chroma. The processing unit 13 then calculates a difference between the first image feature and the second image feature as shown in FIG. 6B (Step $S_{24}$). Finally, the processing unit 13 identifies whether a merged shadow of objects is included in the object range according to the difference between the first image feature and the second image feature, and calculates the block information of objects blocking each other according to the difference between the first image feature and the second image feature. For example, FIG. 6B shows the image feature as a function of the one-dimensional position of the image window. It is able to identify that the image width or area of the object 81' is larger than that of the object 81, and thus the merged shadow of the objects can be distinguished correctly (Step $S_{25}$). Accordingly, the processing unit 13 is able to identify the object blocking each other or the object type. It is appreciated that, FIGS. 4B, 5B and 6B are only examples rather than limitations to the present invention.

It is appreciated that, in the optical touch system 1 of the present invention a number of the image sensor groups is not limited to two. In addition, when the optical touch system 1 identifies that the image windows acquired by the image sensor groups contain object images and that every image window contains identical number of object images, i.e. the objects do not block each other with respect to every image sensor group, the object detection method of the present invention may not be implemented and the 2-dimensional positions of every object with respect to the touch surface 10 can be directly calculated according to one-dimensional coordinates of the object images in the image windows. Preferably, only when different image sensor groups of the optical touch system 1 acquire different numbers of the object images, the object detection method of the present invention is used to identify the objects.

Please refer to FIG. 3A again, after identifying the block information of the objects 81 and 81' acquired by the second image sensor group 11' (Steps $S_{15}$ and $S_{25}$), the processing unit 13 may confirm one-dimensional positions of every object in the one-dimensional images acquired by the first image sensor group 11 and second image sensor group 11', and calculates the positions, corresponding to the touch surface 10, of the objects 81 and 81' in the 2-dimensional space according to the one-dimensional positions of every object. For example, in one embodiment positions of the first image sensor group 11 and the objects 81 and 81' mapped on the 2-dimensional space may be connected to obtain two connecting lines L1 and L2, and positions of the second image sensor group 11' and the objects 81 and 81' mapped on the 2-dimensional space may be connected to obtain another two connecting lines L3 and L4 such that the connecting lines L1 to L4 can form four cross points and two opposite cross points may be defined as a set of possible solutions. Next, the processing unit 13 identifies that the object 81' in the merged shadow has a larger area or width in the image window acquired by the second image sensor group 11' and knows that the object 81' is closer to the second image sensor group 11' and locates at the cross point of the connecting lines L2 and L4. In this manner, correct positions of the objects 81 and 81' are respectively identified as the cross points of the connecting lines L1 and L3 and the connecting line L2 and L4. It is appreciated that, the method for identifying the positions of objects is only an example rather than a limitation to the present invention. The spirit of the present invention is in that the objects blocking each other can be detected by using different images having the brightness information and image features, and the shadow in the image having the brightness information can be correctly divided related to different objects.

As mentioned above, conventional optical touch systems may not be able to correctly identify the object positions when one object blocks the other. The present invention further provides an optical touch system and object detection method therefor that can identify the block information of the object in the image window acquired by the system according to both the brightness information and the image feature thereby increasing the accuracy of position identification and being able to identify different types of objects.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. An object detection method for an optical touch system, the optical touch system identifying at least one object according to an image of the object blocking invisible light and an image of the object reflecting visible light, the object detection method comprising:
   acquiring a first image and a second image, wherein the first image has a brightness information and is formed by the object blocking the invisible light, and the second image has an image feature and is formed by the object reflecting the visible light, wherein the first image and the second image are respectively acquired by different partial areas of a same sensing array;
   calculating a representative brightness of every column of pixels in the first image according to the brightness information;
   determining an object range of the object in the first image according to the representative brightness;
   calculating the image feature within a pixel range in the second image after the object range in the first image is determined, wherein a width of the pixel range in the second image is determined corresponding to a width of the object range in the first image; and
   identifying a block information of the object within the object range according to the calculated image feature within the pixel range in the second image.

2. The object detection method as claimed in claim 1, wherein the image feature includes at least one selected from the group consisting of a brightness value, a chroma, an edge and a texture.

3. The object detection method as claimed in claim 1, wherein the object range is determined as a part of columns of pixels in the first image having the representative brightness smaller than a threshold.

4. The object detection method as claimed in claim 1, wherein the block information includes at least one selected from the group consisting of (i) an information of a plurality of objects blocking each other and (ii) an information of an object type of the object.

5. The object detection method as claimed in claim 1, wherein the step of determining an object range further comprises the steps of:
   acquiring a background image having a brightness information without any object image;
   calculating a representative brightness of every column of pixels in the background image according to the brightness information without any object image;
   calculating a difference between the representative brightness of every column of pixels in the first image and that in the background image; and
   determining the object range as a part of columns of pixels having the difference larger than a brightness threshold.

6. The object detection method as claimed in claim 1, wherein the representative brightness is a sum of brightness or an average brightness of all pixels in every column of pixels.

7. An optical touch system, comprising:
   a sensing array comprising:
      a brightness sensing unit configured to acquire a first image having a brightness information and formed by at least one object blocking invisible light;
      an image sensing unit configured to acquire a second image having an image feature and formed by the object reflecting visible light, wherein the brightness sensing unit and the image sensing unit are different partial areas of the sensing array; and
   a processing unit configured to
      determine an object range of the object according to a representative brightness of every column of pixels in the first image;
      calculate the image feature within a pixel range in the second image after the object range in the first image is determined, wherein a width of the pixel range in the second image is determined corresponding to a width of the object range in the first image; and
      identify a block information of the object within the object range according to the calculated image feature within the pixel range in the second image.

8. The optical touch system as claimed in claim 7, wherein the processing unit is configured to define a part of columns of pixels in the first image having the representative brightness smaller than a threshold as the object range.

9. The optical touch system as claimed in claim 7, wherein the brightness sensing unit further acquires a background image having a brightness information without any object image, and the processing unit compares a brightness threshold with a difference between the representative brightness of every column of pixels in the first image and that in the background image so as to define the object range.

10. The optical touch system as claimed in claim 7, wherein the image feature includes at least one selected from the group consisting of a brightness value, a chroma, an edge and a texture.

11. The optical touch system as claimed in claim 7, wherein the block information includes at least one selected from the group consisting of (i) an information of a plurality of objects blocking each other and (ii) an information of an object type of the object.

12. The optical touch system as claimed in claim 7, wherein the representative brightness is a sum of brightness or an average brightness of all pixels in every column of pixels.

13. The optical touch system as claimed in claim 7, further comprising at least one invisible light source, wherein the first image is an image formed by the object blocking the invisible light source.

14. The optical touch system as claimed in claim 7, wherein the brightness sensing unit further acquires a first background image having a brightness information without any object image and the image sensing unit further acquires a second background image having an image feature without any object image; the processing unit determines the object range according to a difference between the representative brightness of every column of pixels in the first image and that in the first background image and calculates a difference between the image feature associated with object range in the second image and that in the second background image thereby identifying the block information of the object within the object range.

15. The optical touch system as claimed in claim 7, wherein the processing unit is not configured to determine an object range of the object in the second image according to a representative brightness of every column of pixels in the second image.

\* \* \* \* \*